Jan. 2, 1923.

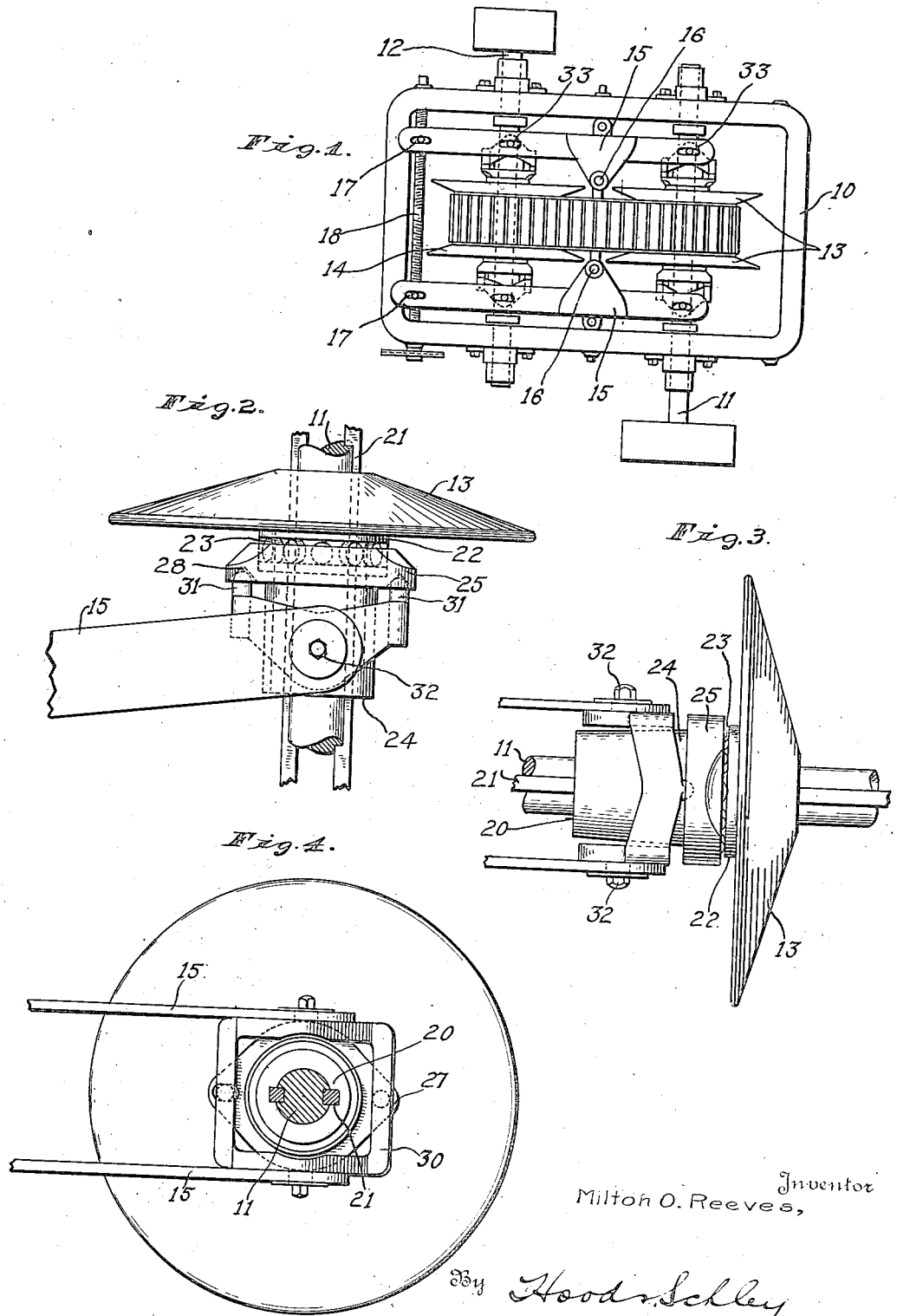

M. O. REEVES.
CONE MOUNTING FOR SPEED VARYING TRANSMISSIONS.
FILED JULY 30, 1920.

1,440,797

2 SHEETS-SHEET 2

Milton O. Reeves, Inventor

By Hood & Schley, Attorney

Patented Jan. 2, 1923.

1,440,797

UNITED STATES PATENT OFFICE.

MILTON O. REEVES, OF COLUMBUS, INDIANA, ASSIGNOR TO REEVES PULLEY COMPANY OF INDIANAPOLIS, INDIANA, A CORPORATION OF INDIANA.

CONE MOUNTING FOR SPEED-VARYING TRANSMISSIONS.

Application filed July 30, 1920. Serial No. 400,126.

*To all whom it may concern:*

Be it known that I, MILTON O. REEVES, a citizen of the United States, residing at Columbus, in the county of Bartholomew and State of Indiana, have invented a new and useful Cone Mounting for Speed-Varying Transmissions, of which the following is a specification.

In that type of speed-varying transmissions, comprising two pairs of co-acting cones connected by a V-shaped belt, the thrusts exerted by the belt upon the cones are so great as to cause considerable difficulty in maintaining the cones in proper condition within the dimensions which are available in commercially practical devices.

The object of my present invention is to provide improvements in details of construction, by means of which the thrusts may be transmitted to the controlling levers by mechanism which will be more efficient than that which has heretofore been used.

Figure 5:
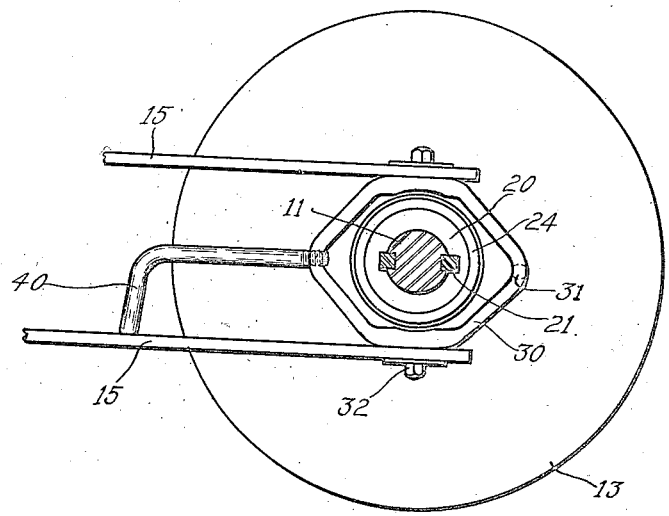
Figure 6:
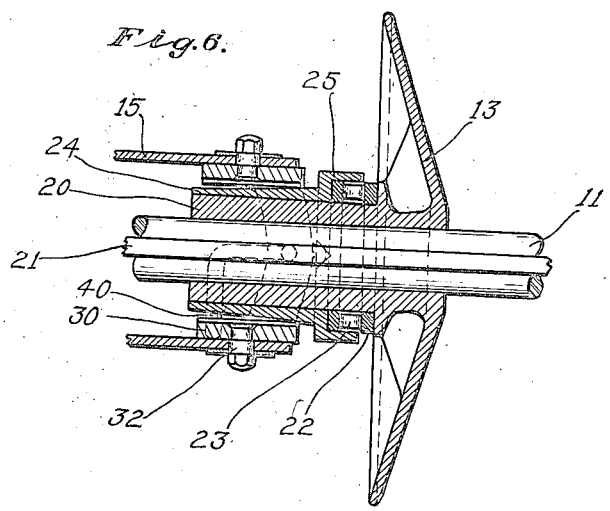

The accompanying drawings illustrate my invention. Fig. 1 is a plan largely diagrammatic in character, of a speed-varying transmission of the type mentioned, and equipped with my improvements; Fig. 2 is a fragmentary plan, on a larger scale, of one of the cones, with its improved thrust bearing and adjacent controlling lever; Fig. 3 is a side elevation of the parts shown in Fig. 2; Fig. 4 an end elevation with the shaft in section; Fig. 5 a view similar to Fig. 4, showing a modification; Fig. 6 a horizontal axial section, on line 6—6 of Fig. 4.

In the drawings, 10 indicates a suitable main frame, in which are journaled the driving shaft 11 and the driven shaft 12, said shafts being parallel and provided with axially movable cone pairs 13 and 14, respectively, the cones of said pairs being oppositely shiftable toward and from each other, by means of controlling levers 15, 15, each pivoted at 16 and simultaneously movable by means of nuts 17, 17, on threaded rod 18.

The construction thus far described is common and well known, and thrust bearings have been introduced between levers 15, 15 and the cones 13 and 14, said thrust bearings being mounted upon the shafts 11 and 12, respectively, and interposed between levers 15 and the ends of the hubs of the cones.

Owing to the fact that the frame 10 must, for commercial reasons, be made as small as possible, and the shafts 11 and 12 as short as possible, so as to reduce the liability of cross bearing between their bearings in the frame 10, difficulty has been experienced, as noted above, in maintaining the thrust bearings and keeping the cones true-running.

In my present improvements, each cone is provided with an elongated hub 20 (dotted lines Figs. 2 and 3) which is splined upon the adjacent shaft by splines 21, this hub being as long as permissible within the range of necessary movement of the cone upon its shaft. At the cone end of the hub, I provide a bearing shoulder 22 against which a series of roller bearings 23 bear. Sleeved upon the hub 20 is a sleeve 24, of a length substantially equal to that of hub 20, and provided at its cone end with a cup 25, receiving the rollers 23.

At diametrically opposite points in a horizontal plane, the cup 25 is provided with lateral extensions 27 having shallow conical pockets 28. Loosely sleeved over sleeve 24 is a thrust yoke 30, provided in its horizontal axis with a pair of pins 31, 31, having semi-spherical ends seated in the shallow pockets 28. By this arrangement a rocking engagement is obtained between the thrust yoke and the cup 25 at diametrically opposite points on the cup and yoke and at right angles to the trunnion axis, thus insuring a uniformity of action of cup 25.

In its vertical axis, i. e., the axis at right angles to the plane in which pins 31 are arranged, the thrust yoke 30 is provided with trunnion pins 32, 32, which project into short slots 33 in controlling levers 15.

Levers 15 are arranged in pairs above and below the thrust yokes and it is essential, because of the slots 33, that these thrust brackets be prevented from rotating under the thrust of the cones. In order to accomplish this result, the thrust brackets are either themselves considerably laterally extended, as shown in Fig. 4, in order to engage the upper and lower levers 15 with a considerable lever arm or, as shown in Fig. 6, a finger 40 is attached to the thrust bracket and extended out for a considerable distance between levers 15 and caused to engage slidingly that one of said levers which will resist turning movement of the thrust bracket, as illustrated in Fig. 5.

By sleeving sleeve 24 over the extended hub of the cone, it is apparent that a considerably greater stability of the cone on its shaft is obtained; that an extended journal bearing for the sleeve upon the hub is obtained, and that ample room for the thrust bracket is also provided without in any way increasing the necessary length of shift between each cone and frame 10 which is required for the axial movement of each cone.

It is also apparent that, by providing the two pins 31 in a plane at right angles to the plane of trunnions 32, the thrust of each cone may be transmitted to the controlling arms without the necessity of extremely accurate machine work.

I claim as my invention:

1. In a speed varying transmission, the combination with belt-receiving cone pairs having extended hubs, and shafts upon which said cone pairs are splined, of a thrust sleeve journaled upon each hub, interengaging thrust members carried by the cone and thrust sleeve, controlling levers, connections between said levers and the thrust sleeves, each of said connections comprising a thrust bracket having a rocking pin engagement with its thrust sleeve, and a trunnion engagement with the adjacent controlling lever, and a laterally extended sliding contact between the thrust bracket and the controlling lever.

2. In a speed varying transmission, the combination with belt-receiving cone pairs having extended hubs and shafts upon which said cone pairs are splined, of a thrust sleeve journaled upon each hub, interengaging thrust members carried by the cone and thrust sleeve, controlling levers, and connections between said levers and the thrust sleeves, each of said connections comprising a thrust bracket having a rocking pin engagement with its thrust sleeve and a trunnion engagement with the adjacent controlling lever.

In witness whereof, I have hereunto set my hand at Columbus, Indiana, this nineteenth day of July, A. D. one thousand nine hundred and twenty.

MILTON O. REEVES